Dec. 30, 1930.  A. W. HARRISON  1,786,996
TORQUE BRAKE
Filed Dec. 19, 1928  3 Sheets-Sheet 1

Inventor.
A. W. Harrison
by Hazard and Miller
Attorneys.

Dec. 30, 1930.  A. W. HARRISON  1,786,996
TORQUE BRAKE
Filed Dec. 19, 1928  3 Sheets-Sheet 2

Inventor
A. W. Harrison
by Hazard and Miller
Attorneys.

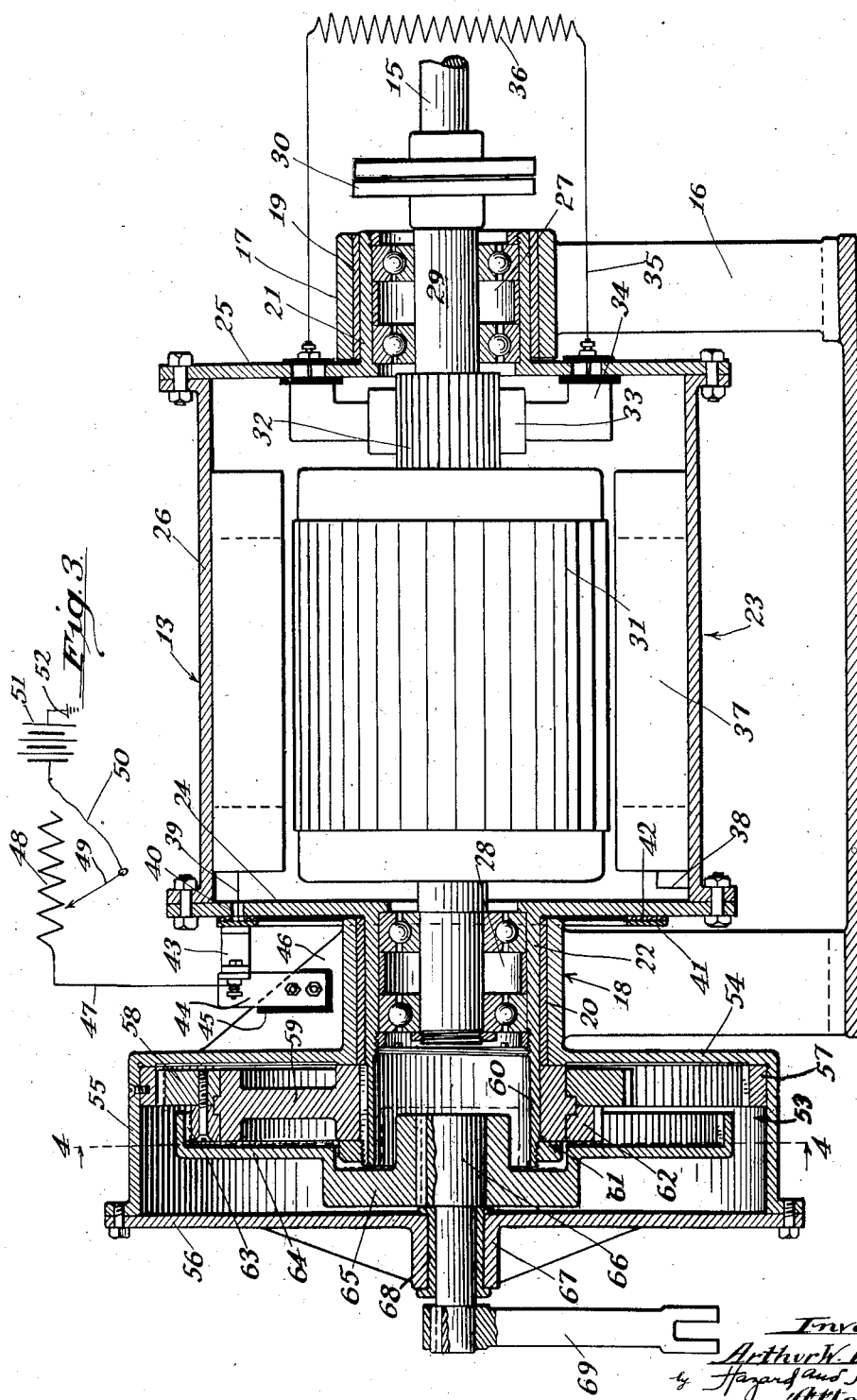

Patented Dec. 30, 1930

1,786,996

UNITED STATES PATENT OFFICE

ARTHUR W. HARRISON, OF LOS ANGELES, CALIFORNIA, ASSIGNOR, BY MESNE ASSIGNMENTS, OF ONE-HALF TO KAY BRUNNER STEEL PRODUCTS, INC., A CORPORATION

TORQUE BRAKE

Application filed December 19, 1928. Serial No. 327,083.

My invention is a torque brake operating by a torque electrically developed.

An object of my invention is the construction of a brake in which a rotating armature of a generator reacts with a rotatable field and causes the field to move in a rotational direction. The motion of the field is translated into a torque applying force, which may be applied to the brakes of the vehicle.

A more detailed object of my invention is in utilizing a substantially constantly driven armature of a generator and having field coils mounted to rotate around the armature. The field coils may be energized when desired and to the desired degree. The current generated by the rotor passes through a load resistor. The reaction of the rotor and the field thus conveys a rotary motion to the field coils.

These field coils are connected to a gear system whereby the speed of rotation may be reduced so that only a partial rotation is obtained at the end of the train of gears. This partial rotation is utilized to exert a pull on brake actuating links, levers or the like to apply the brakes of the vehicle.

In constructing my invention I mount the generator preferably in such a manner as to be driven directly from the engine of an automobile, the rotor being continuously rotated while the engine is running. The casing is rotatably mounted on the armature shaft and has the field coils secured therein. These field coils are energized through the medium of a brush, the current being derived from a battery or the like. The commutator or armature has brushes with lead connections to a load resistor.

The casing carrying the field coils is connected to a reducing gear whereby the speed is much reduced so that the rotation of the field gives only a partial rotation to the resultant device. This preferably has an arm thereon which would only have a partial oscillating movement in any application of the brakes. This arm is connected through a link and various lever systems to the brakes of the vehicle.

My invention is illustrated in the accompanying drawings, in which:

Fig. 3 is a vertical section through the generator and through the reduction gears, taken substantially on the line 3—3 of Fig. 4, the rotor, field and commutator being shown in elevation;

Figure 1:
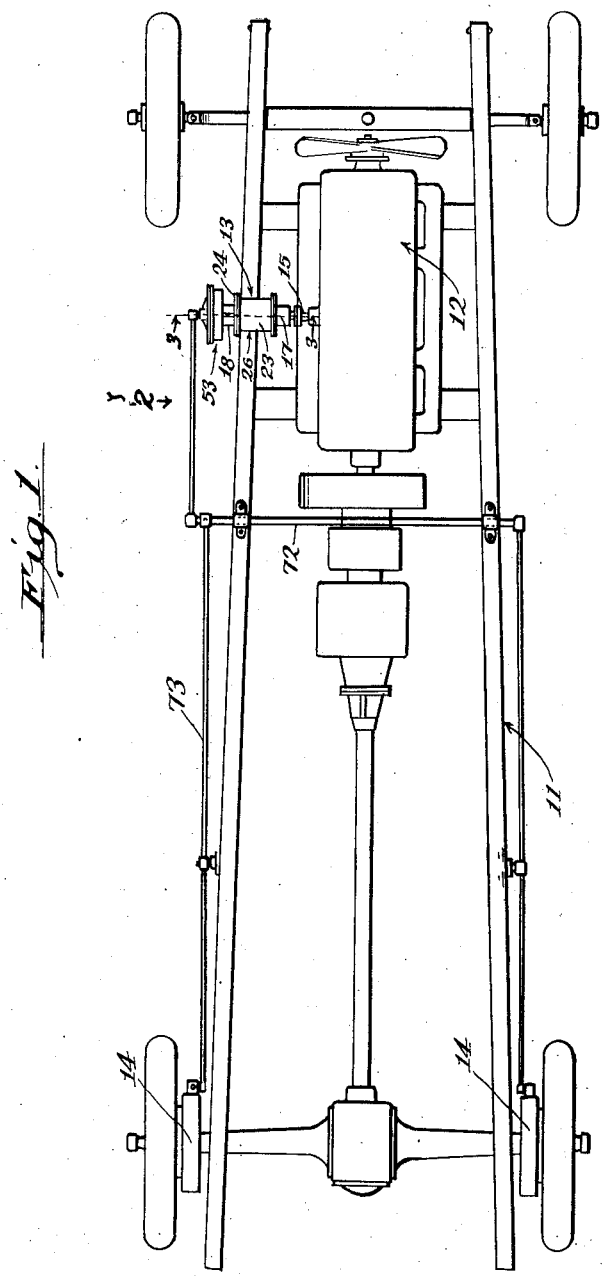
Figure 1 is a plan of the chassis of a vehicle, showing my brakes installed therein.
Figure 2:
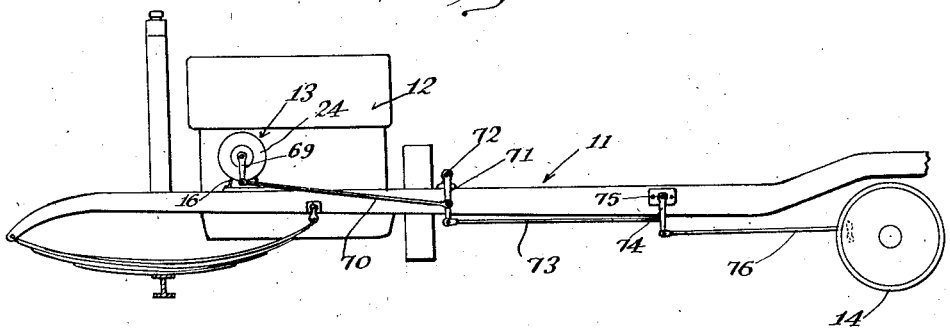
Fig. 2 is a side elevation taken in the direction of the arrow 2 of Fig. 1.

Referring first to Figs. 1 and 2, the vehicle frame is designated generally by the numeral 11. The engine 12 drives the vehicle and also has a suitable drive to the generator designated generally by the numeral 13. The vehicle is illustrated as having brake bands 14 operating on the rear wheels.

Referring particularly to Fig. 3, a shaft 15 extends outwardly from the engine casing and is suitably driven from the engine, the particular drive being more or less immaterial. A supporting frame 16 is mounted on the frame of the vehicle and has a journal 17 at the engine side and a journal 18 remote therefrom. Immediately inside of these journals there are bushings 19 and 20 and journal sections 21 and 22 of the generator casing 23. This casing has end structures 24 and 25 and is illustrated as having a barrel or cylindrical connecting section 26. Immediately inside of the journal sections 21 and 22 there are sets of anti-friction bearings 27 and 28 and on these there is journaled the armature shaft 29. This shaft is connected to the shaft 15 by a coupling 30.

The rotor 31 of the generator is mounted on the armature shaft and is suitably wound, the windings being connected to the commutator 32. Brushes 33 are mounted in suitable brush holders 34, these holders being mounted on the end 25 of the generator casing and having electric leads 35 connected thereto. These leads conduct the current to a load resistor 36 mounted in any suitable part of the vehicle.

The field coils 37 are illustrated as having one coil connected by a lead 38 to the casing 23. This forms a ground connection. From the other coil there is a lead 39 extending through a perforation 40 in the end 24 and being connected to a conducting ring 41 mounted on an insulating ring 42 on the end 24. A brush 43 is connected to a bracket 44 mounted on an insulating plate 45 on a brace 46 of the frame 16. A lead 47 extends from the brush 43 and leads through a control rheostat resistance 48. This resistance is regulated by an operating arm or lever 49 connected by a lead 50 to the battery 51. The other side of the battery is connected to ground 52.

Figure 4:
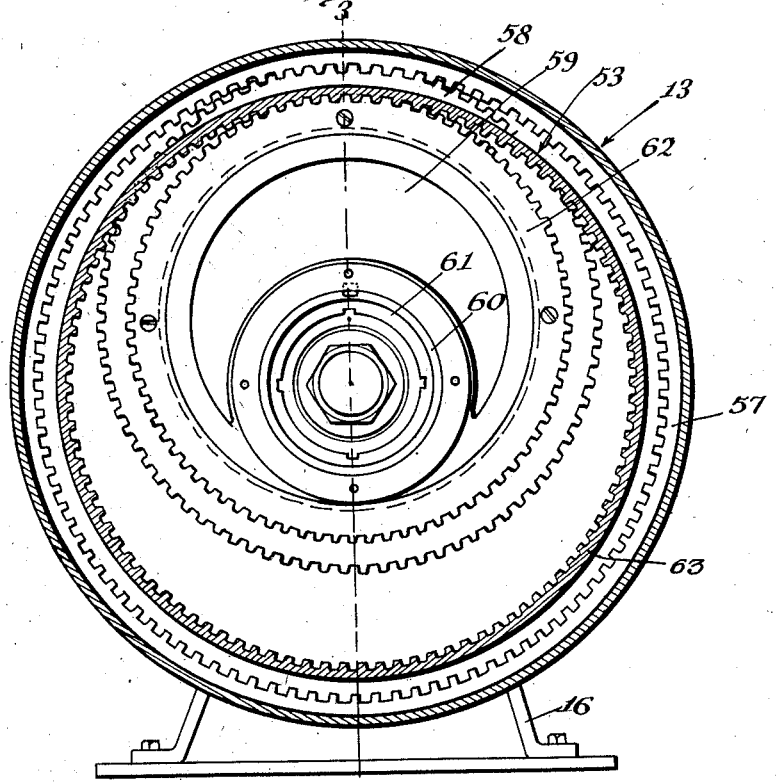
Fig. 4 is a vertical transverse section through the reduction gears on the line 4—4 of Fig. 3.

The reduction gear is indicated particularly in Figs. 3 and 4 and is housed in the gear housing designated generally by the numeral 53. This gear housing is fixed and has an outwardly extending flange 54 connected rigidly to the bearing 18 in the frame 16. Outside of this there is a cylindrical section 55 and a closure plate 56. A transverse internal gear 57 is mounted on the cylindrical part 55 and meshes with an external ring gear 58 rotatably mounted on an eccentric 59. This eccentric is keyed to an extension 60 of the bearing section 22 of the generator casing 23 and therefore rotates with such casing, the eccentric being held in place by the nut 61.

A smaller ring gear 62 rotatably mounted on the eccentric and secured to the gear 58, is rotated by the eccentric and therefore meshes with an internal gear 63 mounted on the web 64. This web has a hub 65 secured to a stub shaft 66. This shaft is illustrated as mounted in the journal 67 extending laterally from the closure plate 56, there being a bushing 68 and a brake actuating arm 69 is keyed or otherwise secured to the outer end of this stub shaft.

The arm 69 is illustrated as connected to a link 70 (note Figs. 1 and 2) which is connected to a rock arm 71 connected to a rock shaft 72, extending across the frame. This rock shaft has two rock arms 71 and on each end there is a link 73 extending along the frame of the vehicle. Each of these links is connected to a second rock arm 74 pivoted on the frame bar 75 and from the end of the second rock arms there are brake actuating links 76 leading to the brake bands 14.

The manner of operation and functioning of my electric torque brake is substantially as follows:

As above described, the rotor of the generator is under continuous rotation while the engine is running but as the fields are not energized in normal operation, there is no current generated. When it is desired to apply the brakes, the switch arm 49 is moved by any suitable mechanism to close the circuit through the rheostat resistance 48. The first contacts transmit the current through the full resistance and the fields are energized by a small current. If a greater application of the brakes is required, the resistance can be cut out by moving the lever 49 a further amount and giving the fields a full energization from the battery of the vehicle. When the fields are energized, current is generated in the rotor and has its circuit through the load resistor 36.

The reaction of the energized fields and of the energized rotor causes the fields to rotate, the casing 23 moving with the fields and rotating on the outer ring of the anti-friction bearings. Thus it will be seen that when the fields are energized and the rotor generates current, a reaction of the rotor and fields gives the rotary movement to the fields.

In the particular gear reduction illustrated, the internal gear 57 is stationary. Therefore when the eccentric 59 rotates, the external ring gears 58 and 62 rotate on the eccentric due to the engagement of the gear 58 with the ring gear 57. The gear 62 meshing with the gear 63 therefore gives a very slow rotary motion to this gear 63 which motion is transmitted through the hub 65 to the shaft 66 and hence to the arm 69, thereby applying the brakes.

When the automobile engine is running it gives a continuous rotation to the shaft 15 and hence to the armature shaft 29 and the armature. The switch 49 of the resistor may be operated to energize the fields, which action causes a rotation of the external gear 57 and from this gear there is a gear reduction developing a torque on the shaft 66, which through the medium of the arm 69 may apply the brakes through the medium of the links 70, the rock arm 71, the links 73, the rock arm 74 and the links 76 connecting to the brake bands 14.

On account of the gear reduction and the motion of the field coils fixedly connected to the casing 23, whereas the armature is continuously rotating, the field coils may only have a partial rotation and hence give an oscillating movement to the arm 69, which arm does not rotate completely.

Various changes may be made in the principles of my invention without departing from the spirit thereof as set forth in the description, drawings and claims.

I claim:

1. An electric brake comprising in combination a generator having rotatably mounted fields and rotor, means to rotate the rotor, a load in circuit with the rotor, means to energize the fields, the reaction of the rotor and the fields causing a rotation of the fields, a reduction gear train operatively connected to the fields, and means at the end of the train to operate brakes.

2. An electric brake comprising in combination a generator having a generator casing rotatably mounted in a suitable support and having fields fixedly connected thereto, a rotor rotatably mounted in the casing and having a load in circuit therewith, means to energize the fields, the reaction of the fields and the rotor rotating the fields, a reduction gear train operatively connected to the generator casing, and means on the end of the train to operate brakes.

3. An electric brake comprising in combination a generator casing having a rotatable mounting, field coils secured to the casing, a rotor having an armature shaft journaled in the casing and rotatable independently of the casing, means to rotate the said shaft, brushes and an electric circuit connected to the windings of the rotor, said circuit having a load resistor therein, an electric lead including a brush forming a connection with the field coils, the reaction of the rotor and the fields causing a rotation of the casing, a reduction gear train connected to the casing, and means on the end of the gear train to operate brakes.

4. An electric brake comprising in combination a generator housing having journal ends mounted in bearings, field coils secured to the casing, wiring and brushes leading to said coils, one of the coils being grounded, an armature shaft journaled in the journal ends of the casing and having an armature mounted thereon, a commutator on the shaft, brushes connected to the casing, a load resistor connected to said brushes, means to rotate the armature shaft, the reaction of the armature and the fields rotating the fields, means interconnected with the generator casing having a gear train to give a reduced speed motion, and a device connected to said means to actuate brakes.

5. An electric brake comprising in combination a supporting structure having a gear casing at one end, a generator casing having journal ends mounted in bearings at one end of the gear casing and at the other end of the said structure, field coils secured to said casing, an armature shaft rotatably mounted in said journals of the casing, an armature and a commutator on the shaft, brushes secured to the casing and bearing on the commutator, a load resistor in circuit with the brushes, means to energize the field coils, whereby on rotation of the armature the casing rotates, a fixed gear mounted in the gear casing, a reduction train of gears operating in conjunction therewith, and means actuated by the gear train to apply brakes.

6. An electric brake comprising in combination a suitable stand having a generator casing with reduced journal ends mounted in bearings in the stand, field coils secured to the inside of the casing, a fixed brush, a conductor mounted on the casing cooperating therewith, a lead from the conductor to one of the coils and a lead from another of the coils to the casing forming a ground, an armature shaft rotatably mounted in the journals of the casing and having an armature and a commutator thereon, brushes secured to the casing bearing on the commutator, a load resistor in circuit with the latter brushes, means to energize the circuit to the field coils, whereby the reaction of the field coils and the armature cause a rotation of the fields and the casing, a reduction gearing connected to the casing and a brake operating device at the end of said gearing.

7. An electric brake as claimed in claim 8, the reduction gearing comprising a fixed gear casing having a fixed internal gear mounted therein, an eccentric mounted on an extension of the casing and having a pair of external gears rotatably mounted on the eccentric, one of said gears engaging with the internal gear, a second internal gear engaging with one of the gears on the eccentric, and a lever operated by the second internal gear to apply the brakes.

8. In combination with an automobile having an engine, an electric generator having rotatably mounted fields and a rotor, means to rotate the rotor by the engine, a load in circuit with the rotor, means to energize the fields, the reaction of the fields and the rotor causing a rotation of the fields, a reduction gear train operatively connected to the fields, brakes on the vehicle and means at the end of the train to operate said brakes.

9. In combination with an automobile having an engine, a generator casing having journal ends mounted in the bearing, field coils secured to the casing, wiring and brushes leading to the coils, one of said coils being grounded, an armature shaft journaled in the journal ends of the casing having an armature thereon and said shaft being driven by the motor, a commutator on the shaft, brushes connected to the casing, a load resistor connected to said brushes, means to rotate the armature shaft, the reaction of the armature rotating the fields, means interconnected with the generator casing having a gear train to give a reduced speed motion, brakes on the vehicle and means connected to the end of the gear train to operate the said brakes.

In testimony whereof I have signed my name to this specification.

ARTHUR W. HARRISON.